United States Patent
Teraoka

(10) Patent No.: US 10,646,945 B2
(45) Date of Patent: May 12, 2020

(54) SOLDERING APPARATUS AND METHOD

(71) Applicant: Hakko Corporation, Osaka, Osaka (JP)

(72) Inventor: Yoshitomo Teraoka, Osaka (JP)

(73) Assignee: HAKKO CORPORATION, Osaka (JP)

(*) Notice: Subject to any disclaimer, the term of this patent is extended or adjusted under 35 U.S.C. 154(b) by 69 days.

(21) Appl. No.: 15/870,257

(22) Filed: Jan. 12, 2018

(65) Prior Publication Data

US 2018/0200819 A1 Jul. 19, 2018

(30) Foreign Application Priority Data

Jan. 17, 2017 (JP) .................................. 2017-006074

(51) Int. Cl.
| | | |
|---|---|---|
| B23K 3/00 | (2006.01) | |
| B23K 3/03 | (2006.01) | |
| B23K 3/06 | (2006.01) | |
| B23K 23/00 | (2006.01) | |
| B23K 3/08 | (2006.01) | |
| B23K 3/02 | (2006.01) | |

(52) U.S. Cl.
CPC .................. B23K 3/03 (2013.01); B23K 3/02 (2013.01); B23K 3/063 (2013.01); B23K 3/08 (2013.01); B23K 23/00 (2013.01)

(58) Field of Classification Search
CPC ............................................ B23K 1/00–3/087
USPC .................. 228/102, 103, 105, 8–12, 51–55
See application file for complete search history.

(56) References Cited

U.S. PATENT DOCUMENTS

| | | | | | |
|---|---|---|---|---|---|
| 5,525,777 | A | * | 6/1996 | Kukuljan ............. | B23K 1/0056 219/121.83 |
| 6,685,080 | B1 | * | 2/2004 | Kee ....................... | B23K 1/018 228/102 |
| 2001/0054637 | A1 | * | 12/2001 | Hayakawa ........... | B23K 1/0056 228/102 |
| 2007/0235504 | A1 | * | 10/2007 | Lahaie ................... | B23K 31/12 228/103 |
| 2008/0237313 | A1 | * | 10/2008 | Fukaya ................. | B23K 1/0056 228/227 |

(Continued)

FOREIGN PATENT DOCUMENTS

| | | | |
|---|---|---|---|
| CN | 104668695 A | 6/2015 | |
| DE | 4121710 A1 * | 1/1993 | ............. B23K 31/12 |

(Continued)

OTHER PUBLICATIONS

Machine translation of DE-102009052529A1 (no date available).*
Machine translation of JP-11277224A (no date available).*

*Primary Examiner* — Kiley S Stoner
(74) *Attorney, Agent, or Firm* — Squire Patton Boggs (US) LLP

(57) ABSTRACT

A soldering apparatus and method involves capturing an image of a soldering operation, and storing image data in association with that particular soldering operation. A soldering tool that is used to perform the soldering operation has a position during the soldering operation, and the image data could also be stored in association with data for that particular position. The position data could be for an operation start point and/or an operation endpoint. Associating the image data in this way could help a manufacturer investigate soldering abnormalities that might be reported after a product is shipped to a customer.

27 Claims, 8 Drawing Sheets

(56) References Cited

U.S. PATENT DOCUMENTS

| | | | | |
|---|---|---|---|---|
| 2014/0076956 A1* | 3/2014 | Lu | ........................ | B23K 1/0016 |
| | | | | 228/102 |
| 2016/0031044 A1* | 2/2016 | Marino | ................ | B23K 1/0016 |
| | | | | 228/102 |
| 2016/0096232 A1* | 4/2016 | Marino | ................ | B23K 3/0471 |
| | | | | 228/9 |
| 2017/0173719 A1* | 6/2017 | Nguyen | ............... | B23K 1/0016 |
| 2018/0001409 A1* | 1/2018 | Tsai | ..................... | B23K 1/0016 |

FOREIGN PATENT DOCUMENTS

| | | | | |
|---|---|---|---|---|
| DE | 102009052529 A1 * | 5/2010 | | |
| DE | 102009017900 A1 * | 10/2010 | ........... | B23K 1/0056 |
| JP | 11277224 A * | 10/1999 | | |
| JP | 2001244694 A * | 9/2001 | | |
| JP | 2006/187912 A | 7/2006 | | |
| JP | 2010/029888 A | 2/2010 | | |
| JP | 5981621 B1 * | 8/2016 | | |
| WO | WO 2017/026802 A1 * | 2/2017 | | |

\* cited by examiner

| Substrate | Sequential Order | Soldering Operation Type | Operation Position | TIP POSITION DATA | | | | CONDITION TYPE | Image Recording Flag | ... | IMAGE DATA | | Analysis Result Flag | ... |
| | | | | X | Y | Z | θ | | | | AFTER OPERATION | DURING OPERATION | | |
| --- | --- | --- | --- | --- | --- | --- | --- | --- | --- | --- | --- | --- | --- | --- |
| PL1 | 1 | Point Soldering | End | x11 | y11 | z11 | θ11 | Condition 11 | 1 | ... | After operation image data 11 | — (none) | 0 | ... |
| | 2 | Draw Soldering | Start | x121 | y121 | z121 | θ121 | Condition 12 | 1 | ... | After operation image data 12 | During operation image data 12 | 1 | ... |
| | | | End | x122 | y122 | z122 | θ122 | | | ... | | | | ... |
| | ... | ... | ... | ... | ... | ... | ... | ... | ... | ... | ... | ... | ... | ... |
| PL2 | 1 | Point Soldering | End | x21 | y21 | z21 | θ21 | Condition 21 | 2 | ... | — (none) | — (none) | — (none) | ... |
| | ... | ... | ... | ... | ... | ... | ... | ... | ... | ... | ... | ... | ... | ... |
| ... | ... | ... | ... | ... | ... | ... | ... | ... | ... | ... | ... | ... | ... | ... |

FIG. 4

SOLDERING APPARATUS AND METHOD

CROSS-REFERENCE TO RELATED APPLICATION

This application claims the benefit of priority to Japanese Application No. 2017-006074, filed Jan. 17, 2017, the entire contents of which are hereby incorporated by reference.

FIELD

This disclosure relates generally to soldering equipment and, more particularly, to a soldering apparatus that captures an image of a soldering area.

BACKGROUND

A soldering apparatus may capture an image of a soldering area and then use the image momentarily for comparison against a reference image to determine whether an abnormality in soldering is present or absent. If present, further processing of the substrate can be halted. If absent, the substrate can be allowed to proceed to subsequent steps in manufacturing and transportation. However, abnormalities may also arise during subsequent steps, particularly after the substrate has been shipped out of the manufacturing facility. After shipping, images of the substrate are no longer available for review in the event that an abnormality is reported by a customer, and the manufacturer cannot investigate until the substrate is returned to the manufacturing facility. Also, since images have not been saved and associated with particular substrates and specific locations on a substrate, the manufacturer may not be able to confirm whether the abnormality or defect occurred during the soldering process or after shipping. Another issue is that the criteria of identifying abnormalities may differ from person to person. Thus, a customer may regard a substrate as having an abnormality even if the soldering apparatus has determined that no abnormality was present. When the manufacturer desires to improve its identification criteria in response to customer reports of abnormalities, it is difficult to make improvements without the ability to refer to images taken during the soldering process. Accordingly, there is a need for a soldering apparatus and method that address the above needs, such as those that that allow for rapid confirmation of an abnormal area of a substrate when a problem is reported after the substrate is shipped away.

SUMMARY

Briefly and in general terms, the present invention is directed to a soldering apparatus and method.

In aspects of the invention, a soldering apparatus comprises a soldering tool for performing a soldering operation, the soldering tool comprising a tip; a camera oriented toward the tip, the camera configured to generate image data of the soldering operation; and a controller including a memory, the controller in communication with the camera, the controller configured to receive image data from the camera and to store the image data in the memory, the image data being stored in association with the soldering operation.

In aspects of the invention, a soldering method comprises performing a soldering operation that comprises using a soldering tool to deposit solder on one or both of a substrate and a component portion on the substrate; capturing an image of the solder that was deposited; and storing image data corresponding to the image that was captured, the image data being stored in a memory based on an indicator in the memory, the image data being stored in association with the soldering operation, the indicator associated with the soldering operation and indicating that the image data should be stored for the soldering operation.

The features and advantages of the invention will be more readily understood from the following detailed description which should be read in conjunction with the accompanying drawings.

BRIEF DESCRIPTION OF THE DRAWINGS

FIG. 4 is a data table showing an example of how images may be stored in association with particular substrate types, specific locations on a substrate, types of soldering operations, and/or soldering parameters.

DETAILED DESCRIPTION

Figure 1:
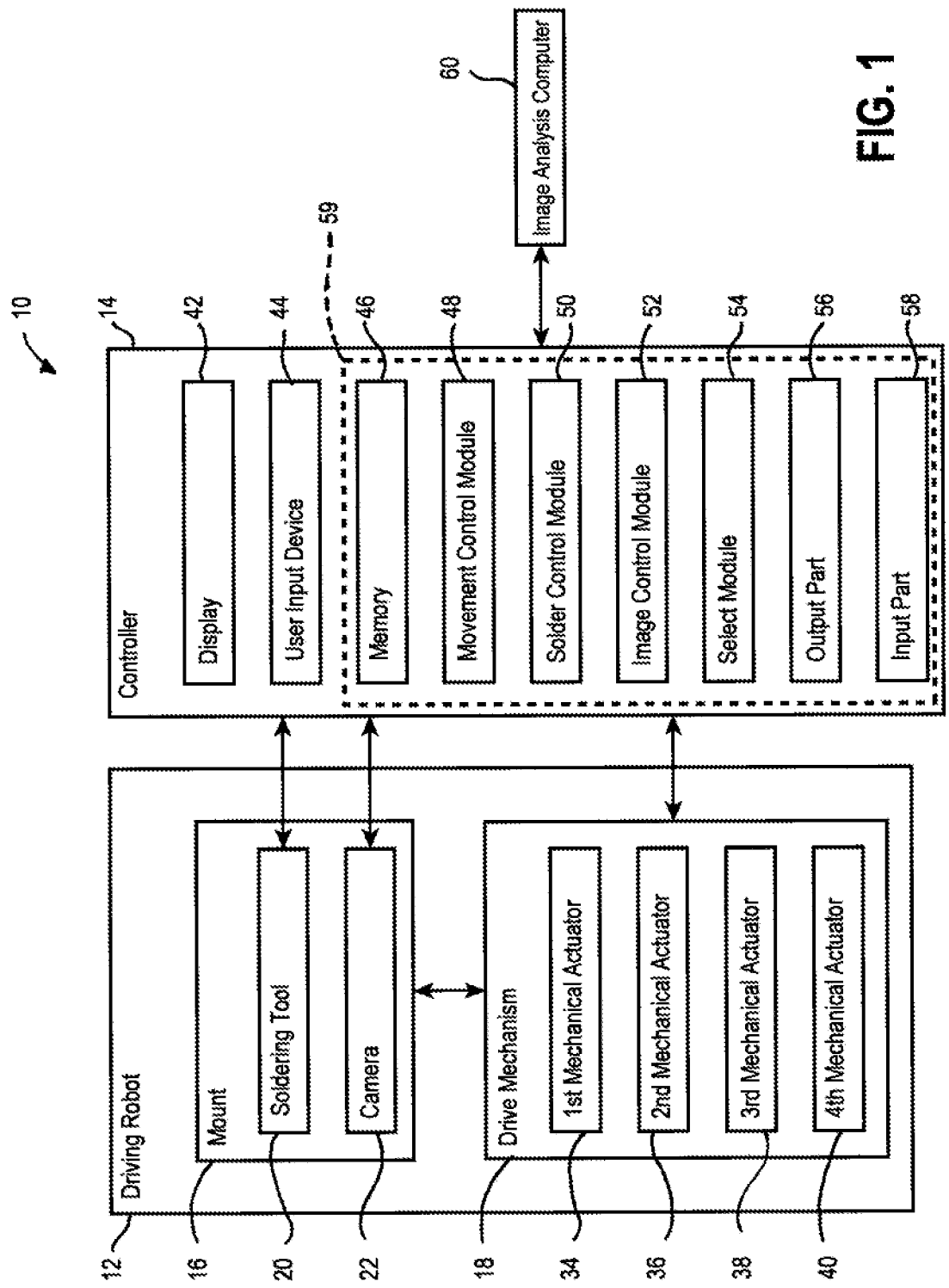
FIG. 1 is a block diagram of an example soldering apparatus.

Referring now in more detail to the example drawings for purposes of illustrating aspects of the invention, wherein like reference numerals designate corresponding or like elements among the several views, there is shown in FIG. 1 an example soldering apparatus 10 having 4-axis driving robot 12 and controller 14. Driving robot 12 comprises mount 16 and drive mechanism 18. Mount 16 is secured to drive mechanism 18.

Figure 2:
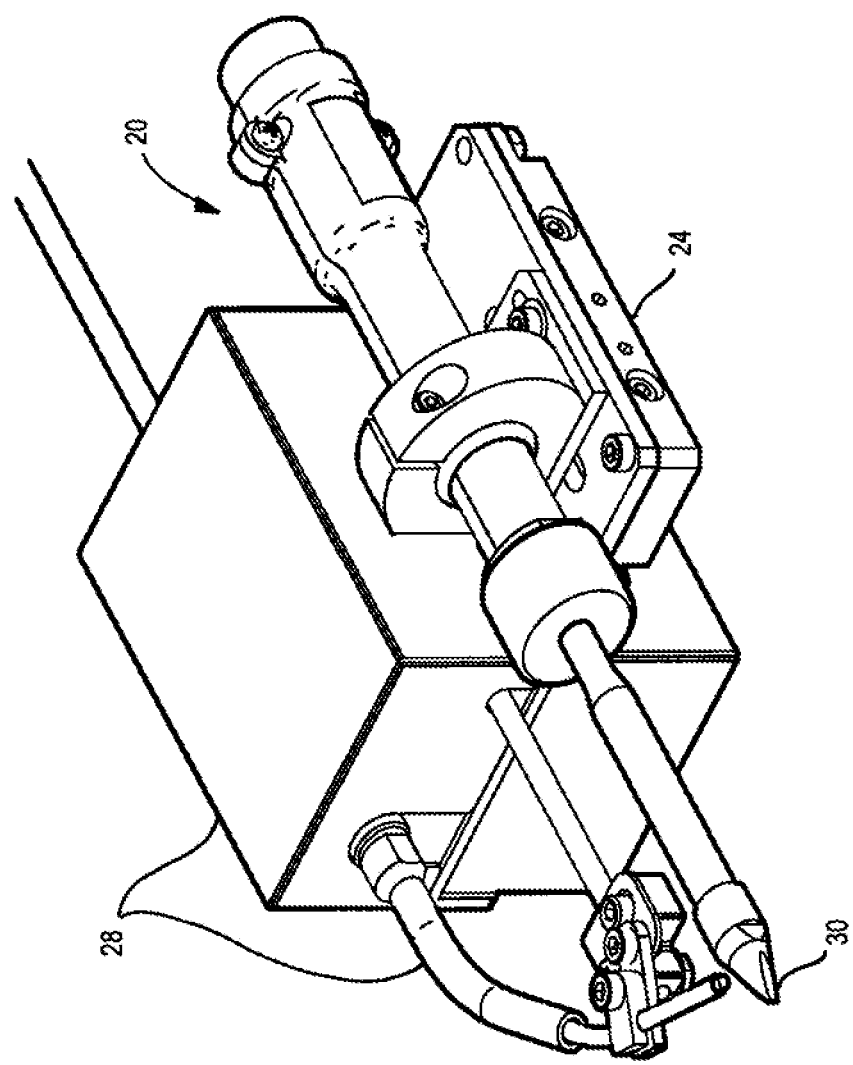
FIG. 2 is a perspective diagram of an example soldering tool of the soldering apparatus.
Figure 3:
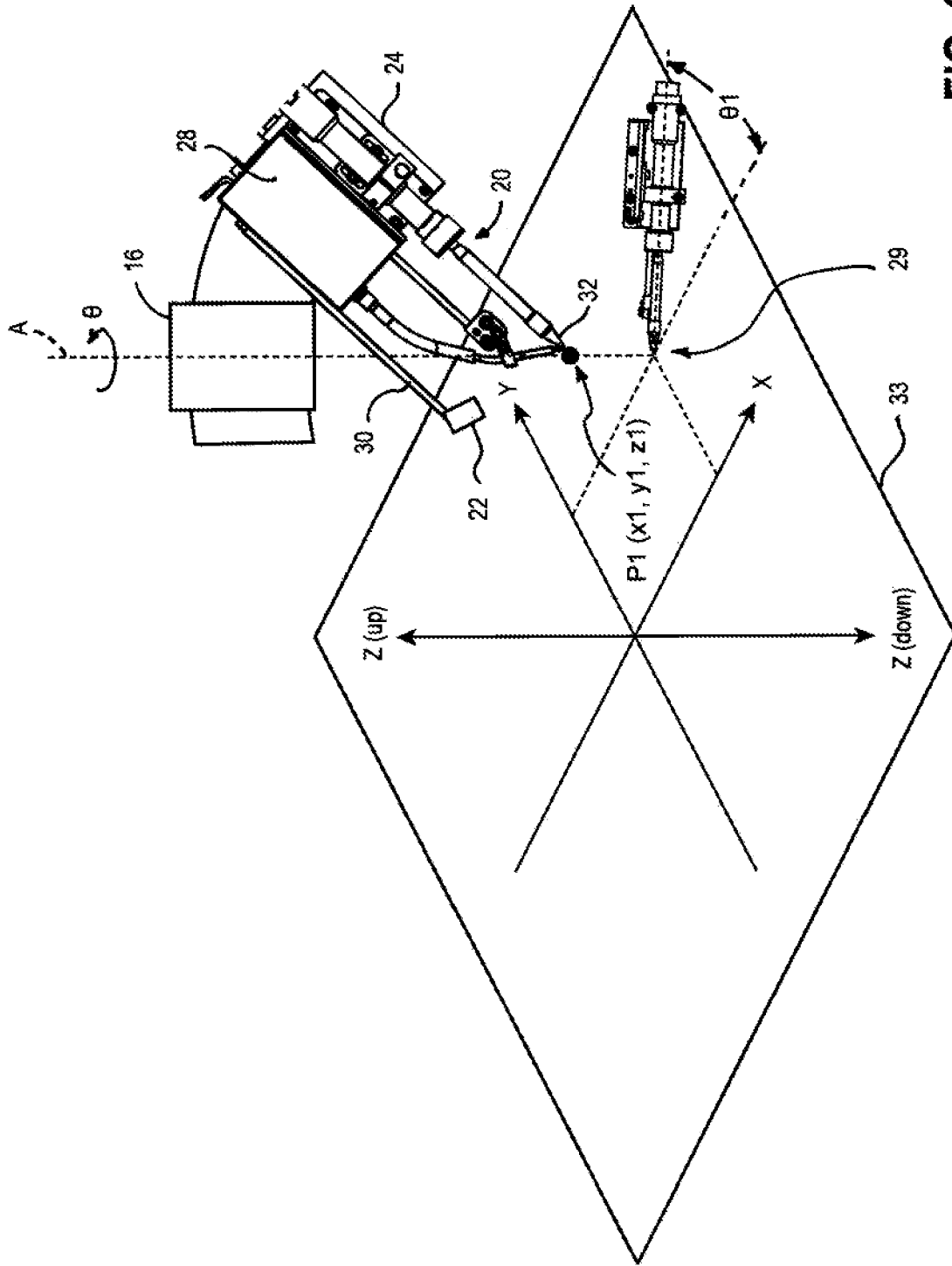
FIG. 3 is a perspective view of the soldering tool positioned over a substrate to which solder will be deposited.

FIGS. 2 and 3 show an example soldering tool 20 of soldering apparatus 10. Soldering tool 20 may take various forms. For example, soldering tool 20 may be a soldering iron that comprises an internal heater, such as an electrical heating element, that heats the soldering iron tip, as illustrated, that can be placed in contact with a substrate and/or components on which solder is to be deposited. Soldering tool 20 may be a hot air tool that blows heated air out of its tip toward the substrate and/or components on which solder is to be deposited.

In FIG. 3, mount 16 is in the form of an arm. Soldering tool 20 is connected to tool base 24 and solder feeder 28. Solder feeder 28 supplies solder in the form of a wire to the tip of soldering tool 20. Tool base 24 is secured to mount 16, which enables drive mechanism 18 to move soldering tool 20. Soldering tool 20 and solder feeder 28 move together with the tool base 24. That is, when tool base 24 is moved up, down, left, and right, the result is that soldering tool 20 and solder feeder 28 move up, down, left, and right simultaneously with and to the same extent as tool base 24.

Camera 22 captures images of processing area 29 and generates image data. Camera 22 can generate still image data and/or video image data. As used herein, the term "video image" refers to a moving image, that is an image that shows movement. For example, without limitation, the movement can be in the form of tip 32 moving relative to substrate 33 and solder being deposited. Camera 22 is supported by bracket 30 so that camera 22 faces tip 32 of soldering tool 20. Bracket 30 is secured to either mount 16, solder feeder 28, or tool base 24. Camera 22, soldering tool 20 and tool base 24 move integrally. That is, when tool base 24 is moved up, down, left, and right, the result is that camera 22 and soldering tool 20 move up, down, left, and right simultaneously with and to the same extent as tool base 24. This can shorten the time needed to turn camera 22 toward processing area 29.

Camera 22 comprises an image sensor, such as a charge-coupled device (CCD), complementary metal-oxide semiconductor (CMOS), or other type of sensor configured to convert light to electronic signals. Camera 22 may further comprise a computer processor that processes the electronic signals to generate image data having a particular format, such as bitmap, JPEG, TIFF, GIF, MPG or other electronic file format for still or video images that are suitable for image recognition analysis.

As shown in FIG. 3, drive mechanism 18 can move tip 32 of soldering tool 20 to predetermined point P1 in space relative to substrate 33. P1 has coordinates (x1, y1, and z1) in orthogonal axes X, Y, and Z. The X- and Y-axes may be parallel to a top surface of substrate 33, and the Z-axis may be perpendicular to the top surface. Soldering tool 20 is oriented at angle θ1, which is visualized by the imaginary projected image of tool 20 illustrated on the top surface of substrate 33.

As mentioned above, soldering tool 20 is secured to tool base 24, tool base 24 is secured to mount 16, and mount 16 is secured to drive mechanism 18. Drive mechanism 18 moves tip 32 by moving mount 16 along the X-, Y-, and Z-axes. Drive mechanism 18 moves soldering tool 20 by rotation angle θ about rotation axis A. Rotation axis A may be parallel to the vertical Z-axis. Tip 32 is located on rotation axis A. Tip 32 remains at rotation axis A while drive mechanism 18 rotates mount 16 and soldering tool 20 by rotation angle θ.

Referring again to FIG. 1, drive mechanism 18 comprises first mechanical actuator 34, second mechanical actuator 36, third mechanical actuator 38, and fourth mechanical actuator 40. Each of the mechanical actuators may comprise an electric motor, solenoid, pneumatic cylinder, and/or other type of device configured to move mount 16 based on control signals from movement control module 48 of control device 14. First mechanical actuator 34 moves tip 32 along the X-axis to the x coordinate (for example, x1) under the control of movement control module 48. Second mechanical actuator 36 moves tip 32 along the Y-axis to the y coordinate (for example, y1) under the control of movement control module 48. Third mechanical actuator 38 moves tip 32 along the Z-axis to the z coordinate (for example, z1) under the control of movement control module 48. Fourth mechanical actuator 40 orients tip 32 by rotating soldering tool 20 by angle θ (for example, θ1) about rotation axis A under the control of movement control module 48.

Controller 14 comprises display 42, user input device 44, memory 46, movement control module 48, solder control module 50, image control module 52, select module 54, output part 56, and input part 58. Display 42 may be a liquid crystal display (LCD), plasma display panel, light-emitting diode display, or other type of device configured to display characters and/or graphics. User input device 44 may be a touch-sensitive panel, keyboard, computer mouse, or other type of device configured to receive input from a person operating apparatus 10.

Memory 46 may be part of computer 59 and/or a mass storage device such as an HDD (magnetic hard disk drive) or SSD (solid state drive). For example, computer 59 can be a microprocessor comprising a CPU (central processing unit), RAM (random access memory) and ROM (read only memory). Memory 46 stores data related to control of soldering operations for substrate 33. Such data may comprise input received from user input device 44. Memory 46 stores images captured by camera 22. Memory 46 stores results generated by image analysis computer 60 configured to analyze the images captured by camera 22. Storage and analysis of image data are performed before substrate 33 is shipped out of the manufacturing facility. Storage and analysis of image data are performed as part of the manufacturing process. For example, storage and analysis of image data for a particular soldering operation can be performed before the next soldering operation is performed by apparatus 10 on the same or different substrate. If no soldering abnormality is detected by image analysis computer 60, the next soldering operation can be performed. If a soldering abnormality is detected by image analysis computer 60, the next soldering operation is not performed.

FIG. 4 shows an example data table representing how data can be stored and associated with each other in memory 46. Stored data comprise substrate information, sequential order of soldering operations, soldering operation type, operation position, tip position data (coordinates x, y, z, and angle θ), condition type, and image recording indicator.

The substrate information (for example, labels PL1, PL2, etc.) represents the type of substrate and/or an identification serial number of the substrate. For example, PL1 may identify one type of substrate for one customer, and PL2 may identify one type of substrate for another customer. Alternatively, PL1 may identify a first substrate used by one customer, and PL2 may identify a second substrate used by the same customer. Labels other than PL1 and PL2 may be used.

Information about the sequential order (for example, 1, 2, 3, etc.) indicates the sequential order of soldering operations to be performed for a particular substrate. Information about operation type identifies the kind of soldering operation to be performed, such as point soldering and draw soldering. For substrates PL1 and PL2, the first operation to be performed is point soldering. For another type of substrate, the first operation could be draw soldering.

Information about operation position (for example, end or start) indicates whether the associated position data (x, y, z, θ) in the same row of the data table correspond to an endpoint or a start point of a soldering operation. For example, point soldering involves placing solder at a single point on the substrate, so an operation position designated as "end" means that the tip position, as defined by the position data in the same row of the data table, corresponds to the endpoint of the point soldering operation. Draw soldering involves placing solder along a solder path on the substrate, so an operation position designated as "end" means that the tip position, as defined by the position data in the same row of the data table, corresponds to the endpoint of the draw soldering operation. An operation position designated as "start" means that the tip position, as defined by the position data in the same row of the data table, corresponds to the start point of the draw soldering operation.

Information about condition type (for example, 11, 12, 21, etc.) specifies the parameters for performing the soldering operation. Parameters for point soldering may comprise the number of times tip 32 touches substrate 33, the time duration for tip 32 to touch substrate 33, and/or the amount of solder supplied to tip 32. Parameters for draw soldering may comprise the movement speed of tip 32, angular rotation speed of soldering tool 20, and/or the amount of solder supplied to tip 32.

The image recording indicator specifies whether any image captured by camera 22 is to be stored in memory 46 for the current soldering operation. For example, the image recording indicator can be a binary flag so that "1" indicates that storage of image data should be performed, and "2" indicates that storage of image data should not be performed. There can be two categories of image data to be stored: "after operation image data," and "during operation image data." Each type is discussed below. When point and draw soldering operations are completed while the image recording flag=1, camera 22 captures an image of processing area 29 after completion of the soldering operation. Memory 46 stores the image data in the category of "after operation image data" and in association with the position of tip 32. The image data would not be stored if image recording flag=2. Values for the flag other than "1" and "2" may be used.

As shown for example in FIG. 4 for substrate PL1, after completion of a point soldering operation (which is the first soldering operation performed for PL1 according to condition 11), memory 46 stores the image data in association with ending tip position data (any one or more of x11, y11, z11, and θ11). The stored image data is labeled as "after operation image data 11." FIG. 4 also shows that after completion of a draw soldering operation (which is the second soldering operation performed for PL1 according to "condition information 12"), memory 46 stores the image data in association with ending tip position data (any one or more of x122, y122, z122, and θ122); and the stored image data is labeled as "after operation image data 12."

During a draw soldering operation with the image recording flag=1, camera 22 captures images of processing area 29, and memory 46 stores the image data in the category of "during processing image data" and in association with the positions of tip 32 during the soldering operation. The image data would not be stored if image recording flag=2. As shown for example in FIG. 4 for substrate PL1, during the draw soldering operation, memory 46 stores the image data in association with the starting and ending tip position data, and the stored image data are labeled as "during processing image data 12." Starting tip position data comprises any one or more of x121, y121, z121, and θ121. Ending tip position data comprises and one or more of x122, y122, z122, and θ122.

In the examples discussed above, the image data are stored also in association with other information on the same row of the data table, such as information about the substrate, soldering operation type, soldering condition type, etc. By associating the image data in this way, the manufacturer may rapidly check a reportedly abnormal area of a particular substrate even after the substrate has been shipped away and is not available for inspection. The manufacturer may use the information to determine a possible cause of an abnormality.

Memory 46 stores results data from image analysis computer 60 (FIG. 1) after soldering. After completion of the soldering operation, image analysis computer 60 analyzes the image data of the soldering operation and outputs analysis results that indicate whether the soldering operation was normal or not. That is, the analysis results indicate whether there is a soldering abnormality. The analysis results are stored in association with the soldering operation. The analysis results can be in the form of a binary flag where "0" indicates a normal soldering operation and/or absence of a soldering abnormality on the substrate, and "1" indicates an abnormal soldering operation and/or presence of a soldering abnormality on the substrate. Values for the flag other than "1" and "0" may be used. The analysis performed by image analysis computer 60 comprises comparing image data stored in memory 46 with predetermined criteria. The predetermined criteria can be in the form a reference image. The reference image may represent a "good" or "passing" example of the current substrate, type of soldering operation, and coordinate location on the substrate. The comparison can be performed by image analysis computer 60 according to known image recognition techniques, such as by running image recognition software.

Image analysis computer 60 can be computer system comprising a processor constructed of one or more microprocessors and/or integrated circuits. The system may further comprise memory that store application programs, data, and an operating system that enable execution of image recognition software.

Movement control module 48 controls drive mechanism 18 to properly position tip 32 according to the tip position data (x, y, z, and θ) associated with the current substrate type and soldering operation. When tip 32 is in proper position, solder control module 50 causes soldering tool 20 to deposit solder according to soldering parameters associated with the condition type for the current substrate type and soldering operation.

Image control module 52 determines the type of image (e.g., still or video image) to be captured and whether the image data is to be stored. As previously mentioned, camera 22 can generate still image data and/or video image data. Optionally, camera 22 has an internal swivel mechanism, mirror, or other internal device for changing the view direction of camera 22, in which case image control module 52 may control the internal device to change the view direction.

Display 42 may display a selection screen that allows the user to set the image recording indicator (for example, image recording flags in FIG. 4) for one or more soldering operations. The image recording indicators are changeable. For example, the selection screen may allow the user to change the image recording indicator at a later time. The user may decide that some soldering operations are not critical or not important, and so the user may change the image recording indictor so that no image data are stored for those soldering operations. This can save memory capacity in memory 46. For example, the user may specify for each soldering operation, via input device 44, whether an image is to be captured and stored. Select module 54 receives the user input to allow the appropriate value for image recording indicator (for example, 1 or 2) to be stored in memory 46.

Functions provided by movement control module 48, solder control module 50, image control module 52, and/or select module 54 could be enabled entirely by hardware, entirely by software, or by a combination of hardware and software. Software may be in the form of firmware, microcode, or resident software, as non-limiting examples. Such software may be embodied in a non-transitory computer-readable medium storing instructions, which when executed, result in the functions described herein for the various modules. Examples of computer-readable media comprise RAM (random access memory), ROM (read-only memory), a magnetic HDD (hard disc drive), and optical disks such as CDs and DVDs. For example, movement control module 48, solder control module 50, image control module 52, and select module 54 are part of computer 59, as indicated in FIG. 1. Computer 59 can be a microcomputer as previously discussed or a processor constructed of one or more microprocessors and/or integrated circuits.

Output part 56 outputs the image data from camera 22 to image analysis computer 60. Input part 58 receives analysis results from image analysis computer 60 and transmits it to memory 46. Output part 56 and input part 58 are parts of computer 59. Output part 56 and input part 58 can be parts of a communication interface circuit communicating with image analysis computer 60.

Figure 5:
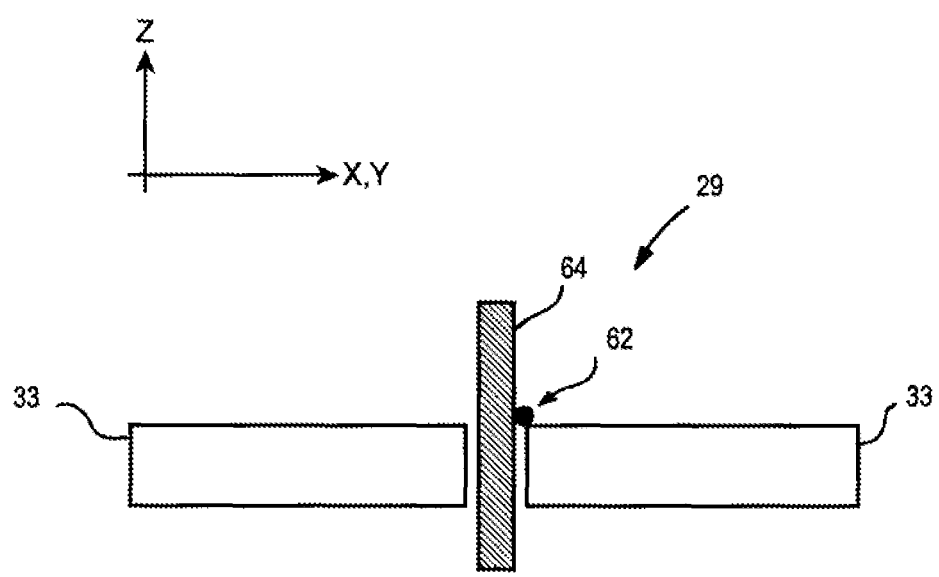
FIG. 5 is a diagram showing an example processing area for a point soldering operation.

FIG. 5 shows example processing area 29 for a point soldering operation. Tip 32 (FIG. 3) of soldering tool 20 will place solder at operation endpoint 62, which is located at an interface between substrate 33 and component portion 64. For example, component portion 64 can be a conductive lead of a switch, capacitor, resistor, microchip, or other type of component.

Figure 6:
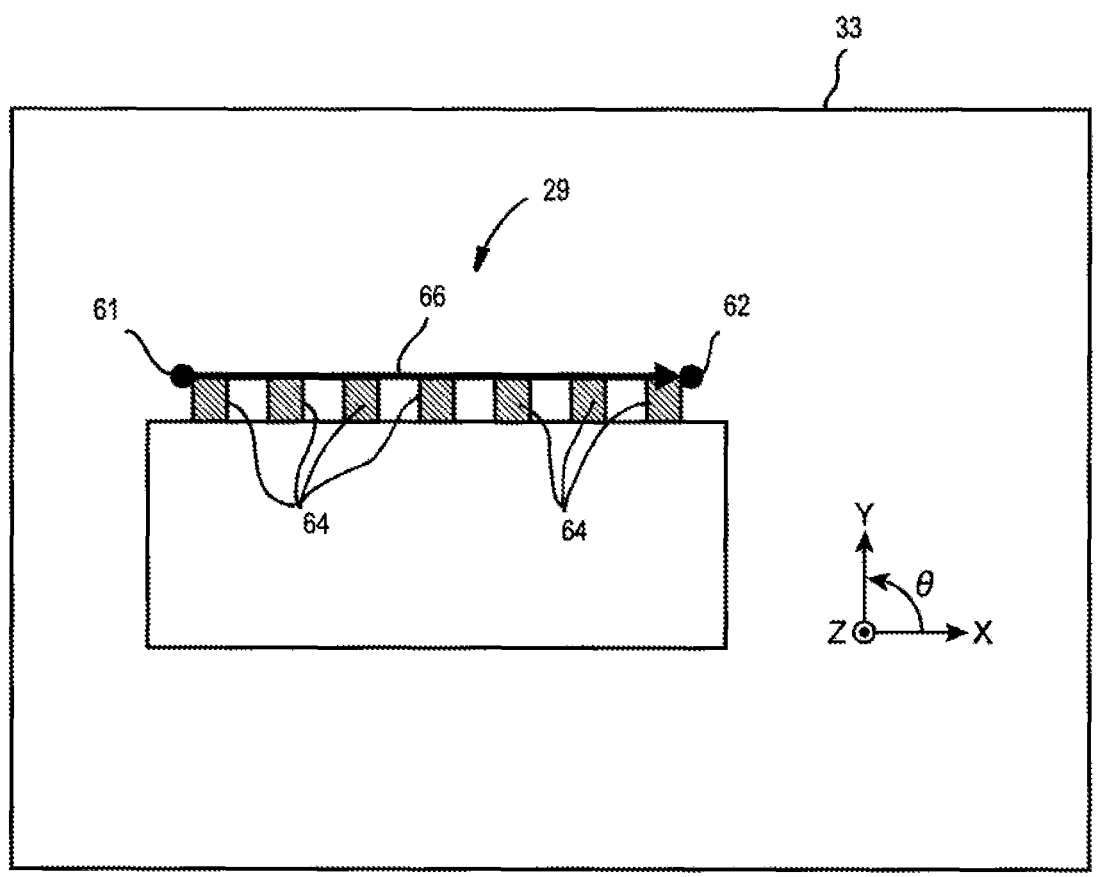
FIG. 6 is a diagram showing an example processing area for a draw soldering operation.

FIG. 6 shows example processing area 29 for a draw soldering operation. Tip 32 (FIG. 3) will place solder along solder path 66 that extends from operation start point 61 to operation endpoint 62. Solder path 66 connects multiple component portions 64.

Figure 7:
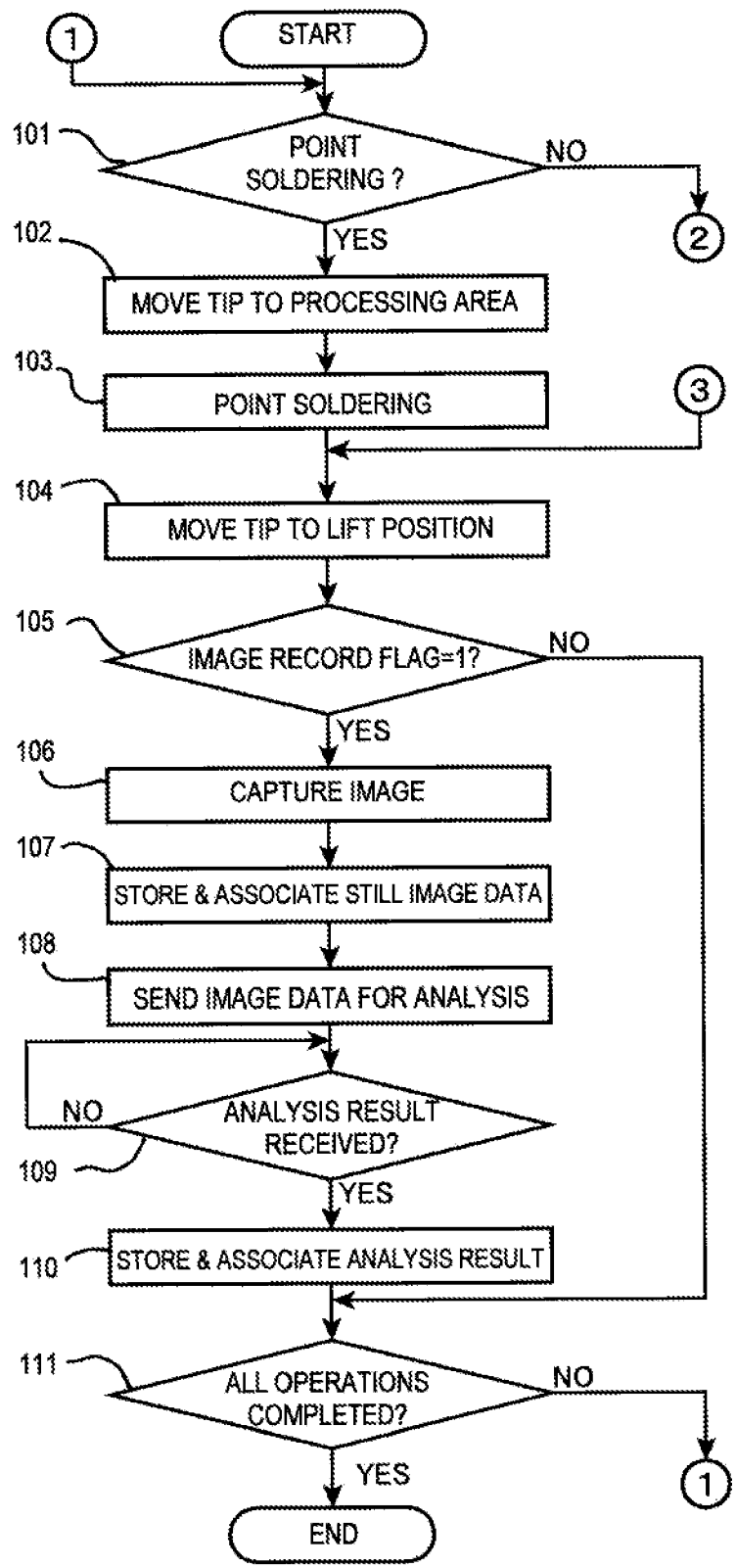
FIGS. 7 and 8 are flowcharts showing an example soldering method.
Figure 8:
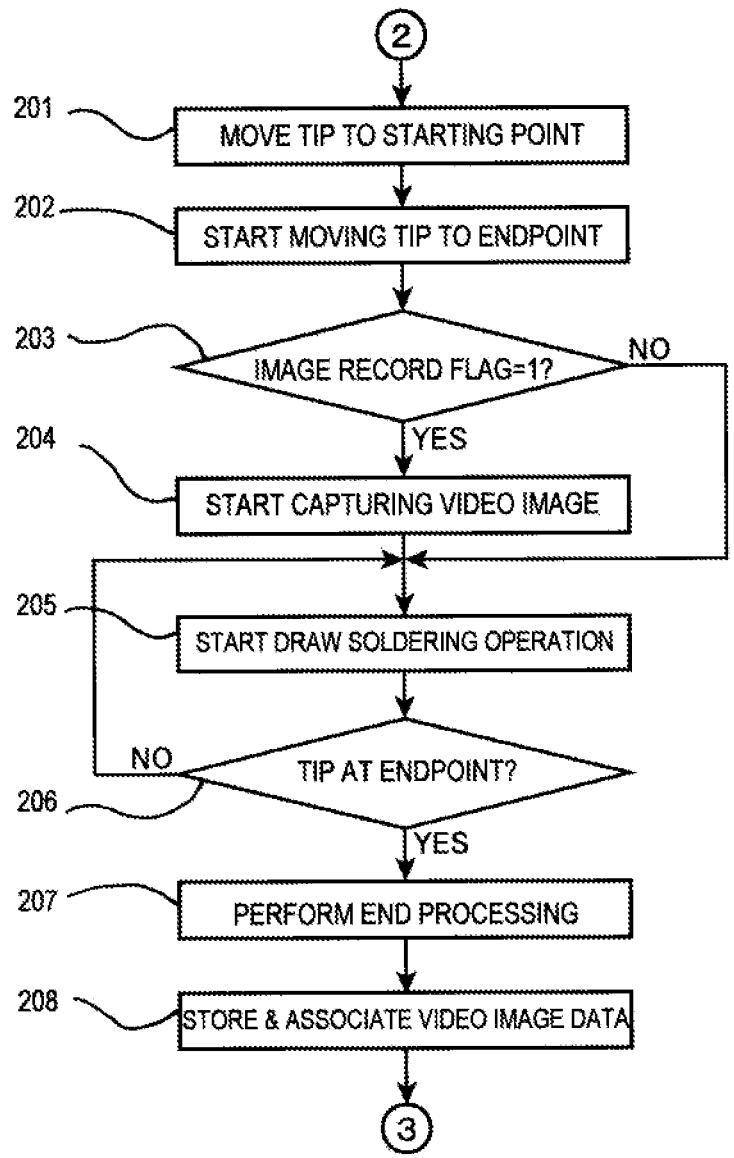

FIGS. 7 and 8 show an example soldering method. Prior to block 101, solder control module 50 has controlled a heater of soldering tool 20 to heat its tip 32, or has controlled a heater to blow hot air out of tip 32. A person (the user) initiates the start of soldering operations for substrate PL1 (FIG. 4). The user may initiate the start of soldering operations by entering a command into user input device 44 (FIG. 1).

At block 101 of FIG. 7, solder control module 50 checks memory 46 to determine whether the current soldering operation is a point soldering operation. As shown in FIG. 4, substrate PL1 is to be subjected to multiple soldering operations. Substrate PL1 may already have been subjected to one or more of the soldering operations. From the sequential list of soldering operations in memory 46, solder control module 50 identifies the current soldering operation as being the earliest soldering operation that has not yet been performed from among all the soldering operations associated with substrate PL1. Next, solder control module 50 determines whether the current soldering operation is to be a point soldering operation. The determination is made based on the operation type specified in memory 46.

If yes at block 101, the method proceeds to block 102 where movement control module 48 controls drive mechanism 18 to move tip 32 according to the tip position data in memory 46. In the example of FIG. 4, movement control module 48 may control drive mechanism 18 to position tip 32 according to x11, y11, z11, θ11 to perform the first soldering operation on substrate PL1. Next, the method proceeds to block 103 where solder control module 50 controls soldering tool 20 to deposit solder according to soldering parameters that correspond to the condition type in memory 46. Next, the method proceeds to block 104.

If no at block 101, then draw soldering is to be performed according to FIG. 8. At block 201 of FIG. 8, movement control module 48 controls drive mechanism 18 to move tip 32 according to the tip position data (x, y, z, and θ) for the start point of the current soldering operation. At block 202, movement control module 48 controls drive mechanism 18 according to the tip position data for the endpoint of the current soldering operation. This causes tip 32 to start moving from the start point to the endpoint of the current soldering operation. The speed of movement can be defined by parameters corresponding to the condition type for the current soldering operation. Next, the method proceeds to block 203.

For example, if the current soldering operation is the second soldering operation (which is a draw operation) to be performed on substrate PL1 in FIG. 4, movement control module 48 controls drive mechanism 18 to move tip 32 to the operation start point according to x121, y121, z121, θ121. This occurs at block 201. Next, at block 202, movement control module 48 controls drive mechanism 18 to start moving tip 32 from the operation start point toward the operation endpoint according to x122, y122, z122, θ122. Movement control module 48 controls drive mechanism 18 according to "condition information 12," which defines movement speed of tip 32. This occurs at block 202.

At block 203 of FIG. 8, image control module 52 determines whether to save image data of the current soldering operation. The determination is based on the image recording flag in memory 46. The determination can be performed at the same time or immediate after tip 42 starts to move toward the operation endpoint.

If no at block 203, image control module 52 does not control camera 22 to capture images or generate video image data. This can prevent memory 46 from storing unnecessary image data, thereby conserving memory capacity. The method proceeds to block 205.

If yes at block 203, image control module 52 controls camera 22 to start capturing images and to generate video image data. This occurs at block 204, and the method proceeds to block 205.

At block 205 of FIG. 8, solder control module 50 controls soldering tool 20 and solder feeder 28 to start draw soldering at the operation start point for the current soldering operation. Solder is deposited on a solder path that extends from the operation start point to the endpoint. According to block 206, draw soldering continues until tip 32 of soldering tool 20 reaches the operation endpoint for the current soldering operation. If yes at block 206 (endpoint has been reached), the method proceeds to block 207. At block 207, solder control module 50, movement control module 48, and/or image control module 52 perform end processing. End processing may comprise any one or a combination of: (a) solder control module 50 controlling solder feeder 28 to stop supplying solder to tip 32, (b) movement control module 48 controlling drive mechanism 18 to stop movement of soldering tool 20, and (c) image control module 52 controlling camera 22 to stop capturing images and to stop generating video image data. Next, the method proceeds to block 208.

At block 208 of FIG. 8, memory 46 stores the video image data generated during blocks 204, 205, and 206. The video image data show solder being deposited along the entire solder path of the draw soldering operation. In many instances but not all, the video image data does not show substrate 33 entirely. The video image data are stored as "during operation image data" (for example, "during operation image data 12" in FIG. 4) in association with the tip position data of the current soldering operation (for example, (x121, y121, z121, θ121) and (x122, y122, z122, θ122)). Next, the method proceeds to block 104 in FIG. 7.

By associating video image data in the manner discussed above, if an abnormality is reported for a particular area of a specific substrate after shipping, image data of the particular area for the specific substrate can be retrieved from apparatus 10 by a user at the manufacturing facility. This can allow the user to determine whether the abnormality was the result of the soldering operation or whether the abnormality occurred after the substrate was shipped away from the manufacturing facility.

At block 104 of FIG. 7, movement control module 48 controls drive mechanism 18 to lift tip 32 to a lift position.

The lift position is at a distance away from a soldering position (an operation endpoint, for example) occupied by tip 32 when solder was being applied. For example, the lift position may have a greater z coordinate than the operation endpoint, while the lift position may have x and y coordinates that are the same as, less than, or greater than the operation endpoint. Next, the method proceeds to block 105.

At block 105 of FIG. 7, image control module 52 determines whether to save image data after tip 32 has been moved to the lift position. The determination is made based on an indicator (for example, an image recording flag) in memory 46. Capturing an image after the tip 32 has been lifted away can reduce the chance of smoke obstructing the view of camera 22. The resulting image data would more likely have a clear view of processing area 29.

If no at block 105, image control module 52 does not control camera 22 to capture an image or generate still image data. This can prevent memory 46 from storing unnecessary image data, thereby conserving memory capacity. The method proceeds to block 111.

If yes at block 105, image control module 52 controls camera 22 to capture an image and to generate still image data. This occurs at block 106, and the method proceeds to block 107. At block 107, memory 46 stores the still image data generated during block 106. The still image data are stored as "after operation image data" (for example, "after operation image data 11" in FIG. 4) in association with the ending tip position data of the current soldering operation (for example, operation endpoint (x11, y11, z11, θ11)). The still image data corresponds to the captured image, which shows solder at the operation endpoint. In many instances but not all, the still image data does not show substrate 33 entirely. Next, the method proceeds to block 108.

By associating still image data in the manner discussed above, if an abnormality is reported for a particular area of a specific substrate after shipping, image data of the particular area of the specific substrate can be retrieved from apparatus 10 by a user at the manufacturing facility.

At block 108 of FIG. 7, output part 56 (FIG. 1) sends the "after operation image data" to image analysis computer 60. At block 109, input part 58 waits until an analysis result is received from image analysis computer 60. When an analysis result is received (yes at block 109), the method proceeds to block 100 where memory 46 stores the analysis result in association with any image data ("after operation image data" and/or "during operation image data"), which was already associated with tip position data. Next, the method proceeds to block 111.

By referring to the analysis result, a user may readily check whether a particular soldering operation was performed abnormally. Thus, the substrate may be prevented from being shipped to a customer if the analysis result indicates an abnormality. Also, in response to a reported abnormality after shipping, the user can determine from the analysis result whether the substrate had the abnormality before it was shipped and/or determine whether the reported abnormality likely occurred after shipping.

At block 111 of FIG. 7, solder control module 50 determines whether all soldering operations have been completed. For example, solder control module 50 can check the sequential order information in memory 46 to determine whether there is no other soldering operation remains after the current soldering operation. If another soldering operation remains (no at block 111), the method returns to block 101. Otherwise, the soldering method for the current substrate may end.

In the foregoing descriptions, the "after operation image data" is stored in association with tip position data. Thus, when an abnormality for a particular substrate is reported by a customer to the manufacturer, the manufacturer may provide the customer with image data of the area corresponding to the reported abnormality before the customer decides to return the substrate to the manufacturer. Also, if desired, the manufacturer may provide the customer with image data of other areas of the particular substrate and/or provide image data of additional substrates.

In the foregoing descriptions, a series of still images can be captured and saved instead of capturing and saving video images. For example, instead of capturing video images and generating video image data at block 204, camera 22 may instead capture a series of still images and generate still image data. The still images are captured at different points in time, separated by a set time interval, while tip 32 is depositing solder during a draw soldering operation. At block 208, the series of still images can be saved in memory 46 as "during processing image data 12" in FIG. 4, for example. Alternatively, the series of still images are combined or stitched together to form a panoramic image of solder path 66 (FIG. 6), and the panoramic image is saved in memory 46 as "during processing image data 12" in FIG. 4. The panoramic image is larger than each one of the still images. Each of the still images shows a different portion of the solder path. The panoramic image shows the entire solder path. In many instances but not all, the panoramic image does not show entire substrate 33. The combining of images may be performed by computer 59.

Various modifications could be made to the method of FIGS. 7 and 8. For example, block 203 and block 204 in FIG. 8 may be copied and added to a point between block 102 and 103 in FIG. 7. This enables still data images and/or video image data to be generated for a point soldering operation. Video image data, if any, can be saved in memory 46 as "during operation image data." For instance, video image data of the first point soldering operation on substrate PL1 can be saved as "during operation image data 11" in association ending tip position data. This is different from what is illustrated in FIG. 7, which shows "(none)" in the column for "during operation" for the first point soldering operation on substrate PL1. With this modification, "(none)" is replaced with "during operation image data 11."

Various modifications could be made to controller 14. For example, output part 56 and input part 58 could be omitted, and image analysis computer 60 could be omitted from the system. Consistent with this modification, blocks 108, 109, and 110 could be omitted from FIG. 7.

Any of the above descriptions can be modified such that select module 54 is omitted from controller 14. Consistent with this modification, the image recording flag could be omitted from FIG. 4, and no image recording flag is stored in memory 46. Also consistent with this modification, blocks 105 and 203 could be omitted from FIGS. 7 and 8.

Any of the above descriptions can be modified such that block 104 is omitted from FIG. 7, or block 104 is moved to a point after block 111 in FIG. 7.

Any of the above descriptions can be modified such that camera 22 is secured to either mount 16 or driving robot 12, instead of being secured to bracket 30. Thus, bracket 30 may be omitted.

Any of the above descriptions can be modified such that soldering apparatus 10 does not comprise driving robot 12, although soldering tool 20 remains. A person may use soldering tool 20 to perform soldering operations manually.

Any of the above descriptions can be modified such that movement control module 48 and image control module 50 are omitted from controller 14. The user may initiate storage of image data, as desired, via commands entered into user input device 44.

Any of the above descriptions can be modified such that information about substrate type is not stored in memory 46. This may be appropriate in manufacturing situations in which there is only a single type of substrate.

Any of the above descriptions can be modified such that information about sequential order of soldering operations is not stored in memory 46. This may be appropriate in manufacturing situations in which there is only a single soldering operation to be performed on each substrate.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A soldering apparatus comprising:
   a soldering tool for performing a soldering operation, the soldering tool comprising a tip, wherein the soldering tool is movable relative to a substrate during the soldering operation;
   a camera oriented toward the tip, the camera configured to generate image data of the soldering operation; and
   a controller including a memory, the controller in communication with the camera, the controller configured to receive image data from the camera and to store the image data in the memory, the image data being stored in association with position data of the tip during the soldering operation, wherein the controller is configured to use an indicator previously stored in the memory to determine whether image data from the camera is to be stored in the memory.

2. The soldering apparatus of claim 1, wherein the controller is configured to associate the image data with information on substrate type and with the position data of the tip during the soldering operation.

3. The soldering apparatus of claim 1, further comprising a mount and a drive mechanism configured to move the mount relative to the substrate, wherein the mount carries the soldering tool, the controller is configured to control the drive mechanism, and the controller is configured determine whether the image data from the camera is to be stored in the memory.

4. The soldering apparatus of claim 3, wherein the mount carries the camera.

5. The soldering apparatus of claim 3, wherein the drive mechanism comprises a plurality of mechanical actuators for moving the mount in various axes of movement relative to the substrate, and each mechanical actuator is configured to move the mount in a different one of the axes.

6. The soldering apparatus of claim 1, wherein the controller is configured to store, in the memory, image data for one or more images captured by the camera while the tip is moving during the soldering operation.

7. The soldering apparatus of claim 6, wherein the image data corresponds to a plurality of still images captured at different times while the tip is moving during the soldering operation, and the controller is configured to combine the still images.

8. The soldering apparatus of claim 1, wherein the controller is configured to store, in the memory, image data for one or more images captured by the camera while the tip is not moving.

9. The soldering apparatus of claim 1, further comprising a computer in communication with the controller, wherein the controller is configured to send image data, which was received from the camera, to the computer, and the computer is configured to detect a soldering abnormality in the image data sent by the controller and configured to send an analysis result to the controller, the analysis result indicating whether a soldering abnormality was detected by the computer in the image data sent by the controller.

10. A soldering method comprising:
    performing a soldering operation that comprises using a soldering tool to deposit solder on one or both of a substrate and a component portion on the substrate, wherein performing the soldering operation comprises moving the soldering tool according to position data in the memory;
    capturing an image of the solder that was deposited;
    storing image data corresponding to the image that was captured, the image data being stored in a memory, the image data being stored in association with the position data of the tip during the soldering operation
    using a computer to analyze the image data and generate an analysis result indicating whether a soldering abnormality is present in the image data; and
    storing the analysis result in the memory in association with the position data.

11. The method of claim 10, wherein the soldering operation is a point soldering operation that deposits the solder at an operation endpoint, and the image that was captured is a still image showing the solder at the operation endpoint.

12. The method of claim 10, wherein the soldering operation is a draw soldering operation that deposits the solder along a solder path that extends from an operation start point to an operation endpoint, and the image that was captured shows the solder path entirely.

13. The method of claim 12, wherein the image that was captured is a video image showing the solder being deposited along the solder path.

14. The method of claim 12, wherein the image that was captured comprises a plurality of still images, and each of the still images shows a different portion of the solder path.

15. The method of claim 10, wherein the moving of the soldering tool is performed by a drive mechanism that is controlled according to the position data in the memory.

16. The method of claim 10, wherein the memory has stored in it a plurality of indicators and information about a plurality of soldering operations, each one of the indicators is changeable to indicate whether image data should be stored for a corresponding one of the soldering operations, and at least one of the indicators indicates that image data should not be stored.

17. The method of claim 10, further comprising:
    performing a second soldering operation that comprises using the soldering tool to deposit solder on one or both of the substrate and a second component portion on the substrate;
    capturing a second image, the second image showing the solder that was deposited during the second soldering operation; and
    storing second image data corresponding to the second image that was captured, the second image data being stored in the memory, the image data being stored in association with the second soldering operation.

18. The soldering apparatus of claim 1, wherein the position data is indicative of one or more coordinates.

19. A soldering apparatus comprising:
   a soldering tool for performing a soldering operation, the soldering tool comprising a tip, wherein the soldering tool is movable relative to a substrate during the soldering operation;
   a camera oriented toward the tip, the camera configured to generate image data of the soldering operation;
   a controller including a memory, the controller in communication with the camera, the controller configured to receive image data from the camera and to store the image data in the memory, the image data being stored in association with position data of the tip during the soldering operation; and
   a computer in communication with the controller, wherein the controller is configured to send image data, which was received from the camera, to the computer, and the computer is configured to detect a soldering abnormality in the image data sent by the controller and configured to send an analysis result to the controller, the analysis result indicating whether a soldering abnormality was detected by the computer in the image data sent by the controller.

20. The soldering apparatus of claim 19, wherein the controller is configured to associate the image data with information on substrate type and with the position data of the tip during the soldering operation.

21. The soldering apparatus of claim 19, further comprising a mount and a drive mechanism configured to move the mount relative to the substrate, wherein the mount carries the soldering tool, the controller is configured to control the drive mechanism, and the controller is configured determine whether the image data from the camera is to be stored in the memory.

22. The soldering apparatus of claim 21, wherein the mount carries the camera.

23. The soldering apparatus of claim 21, wherein the drive mechanism comprises a plurality of mechanical actuators for moving the mount in various axes of movement relative to the substrate, and each mechanical actuator is configured to move the mount in a different one of the axes.

24. The soldering apparatus of claim 19, wherein the controller is configured to store, in the memory, image data for one or more images captured by the camera while the tip is moving during the soldering operation.

25. The soldering apparatus of claim 24, wherein the image data corresponds to a plurality of still images captured at different times while the tip is moving during the soldering operation, and the controller is configured to combine the still images.

26. The soldering apparatus of claim 19, wherein the controller is configured to store, in the memory, image data for one or more images captured by the camera while the tip is not moving.

27. The soldering apparatus of claim 19, wherein the controller is configured to use an indicator previously stored in the memory to determine whether image data from the camera is to be stored in the memory.

* * * * *